United States Patent
Murphy et al.

(10) Patent No.: US 6,914,952 B2
(45) Date of Patent: Jul. 5, 2005

(54) SUPERFRAME ALIGNMENT TO A PRE-EXISTING ADSL DATA EXCHANGE

(75) Inventors: Tim Murphy, Ramona, CA (US); Martin Staszak, Poway, CA (US)

(73) Assignee: 3Com Corporation, Marlborough, MA (US)

( * ) Notice: Subject to any disclaimer, the term of this patent is extended or adjusted under 35 U.S.C. 154(b) by 742 days.

(21) Appl. No.: 09/766,241

(22) Filed: Jan. 19, 2001

(65) Prior Publication Data

US 2002/0097824 A1 Jul. 25, 2002

(51) Int. Cl.$^7$ ............................................... H04L 25/38
(52) U.S. Cl. ...................... 375/369; 375/356; 375/362; 375/260; 375/222; 370/480; 370/509
(58) Field of Search ............................... 375/219–220, 375/260, 356, 362, 364, 365, 366, 369, 370; 370/509–514, 503, 480

(56) References Cited

U.S. PATENT DOCUMENTS

| | | | | | |
|---|---|---|---|---|---|
| 6,134,283 | A | * | 10/2000 | Sands et al. | 375/354 |
| 6,366,554 | B1 | * | 4/2002 | Isaksson et al. | 370/206 |
| 6,456,654 | B1 | * | 9/2002 | Ginesi et al. | 375/229 |
| 6,493,395 | B1 | * | 12/2002 | Isaksson et al. | 375/261 |

OTHER PUBLICATIONS

"Series G: Transmission Systems And Media, Digital Systems And Networks—Asymmetric Digital Subscriber Line (ADSL) Transceivers", ITU–T G.992.1, Jun. 1999, pp. i–240.

"Series G: Transmission Systems And Media, Digital Systems And Networks—Annex H: Specific Requirements For A Synchronized Symmetrical DSL (SSDSL) System Operating In The Same Cable Binder As ISDN As Defined In ITU–T Recommendation G–961 Appendix III", ITU–T G.992.1 Annex H, Oct. 2000, pp. 1–38.

* cited by examiner

Primary Examiner—Phuong Phu
(74) Attorney, Agent, or Firm—McDonnell Boehnen Hulbert & Berghoff LLP

(57) ABSTRACT

A digital subscriber line network allows a plurality of remote modems to communicate without interfering with the communication to the central office. Each symbol of a superframe is converted to a tone vector, and the tone vectors are integrated over a plurality of superframes. The tone vectors of the data symbols are random, and tend to cancel each other out. The tone vector of the synchronization symbol remains constant among the plurality of superframes, and the sum of these tone vectors over a plurality of superframes becomes large. By identifying the largest integrated tone vectors, the network may identify the position of the synchronization symbol. The modems may then align using the position of the synchronization symbol.

16 Claims, 4 Drawing Sheets

SUPERFRAME ALIGNMENT TO A PRE-EXISTING ADSL DATA EXCHANGE

TECHNICAL FIELD

This invention relates to digital subscriber line devices, and more particularly to superframe alignment among multiple modems in a loop.

BACKGROUND

As consumer demand for interactive electronic access to entertainment (e.g. video-on-demand) and information (Internet) in digital format has increased, this demand has effectively exceeded the capabilities of conventional voiceband modems. In response, various delivery approaches have been proposed, such as optical fiber links to every home, direct satellite transmission, and wideband coaxial cable. However, these approaches are often too costly, and cheaper alternatives have emerged, such as the cable modem which uses existing coaxial cable connections to homes and various high bit rate digital subscriber line (DSL) modems which use the existing twisted-pair of copper wires connecting a home to the telephone company central office (CO).

Significant effort has been expended on utilizing existing telephone copper infrastructure and in-home twisted pair cable for communications beyond what is typically available in the DC to 4 kHz 'plain-old telephone service' (POTS) frequency band. Digital Subscriber Line (DSL) and Home Phoneline Networking (HPN) are two examples of such effort. Various DSL standards have been developed, including ANSI T1.413 ADSL specification, ITU G.992.1 full-rate ADSL recommendation and ITU G.992.2 splitterless ADSL recommendation, which enable high-speed communications between a subscriber premise and the central office.

In some network configurations, two or more remote terminal (RT) DSL modems are physically connected to a single phoneline where either modem may communicate with the central office (CO) DSL modem. What is desired is to enable these remote terminal modems to communicate with each other without interfering with the connection between one of the remote terminal modems and the central office DSL modem.

SUMMARY

A digital subscriber line network allows a plurality of remote modems to communicate without interfering with the communication to the central office. Each symbol of a superframe is converted to a tone vector, and the tone vectors are integrated over a plurality of superframes. The tone vectors of the data symbols are random, and tend to cancel each other out. The tone vector of the synchronization symbol remains constant among the plurality of superframes, and the sum of these tone vectors over a plurality of superframes becomes large. By identifying the largest integrated tone vectors, the network may identify the position of the synchronization symbol. The modems may then align using the position of the synchronization symbol.

DESCRIPTION OF DRAWINGS

These and other features and advantages of the invention will become more apparent upon reading the following detailed description and upon reference to the accompanying drawings.

DETAILED DESCRIPTION

Figure 1:
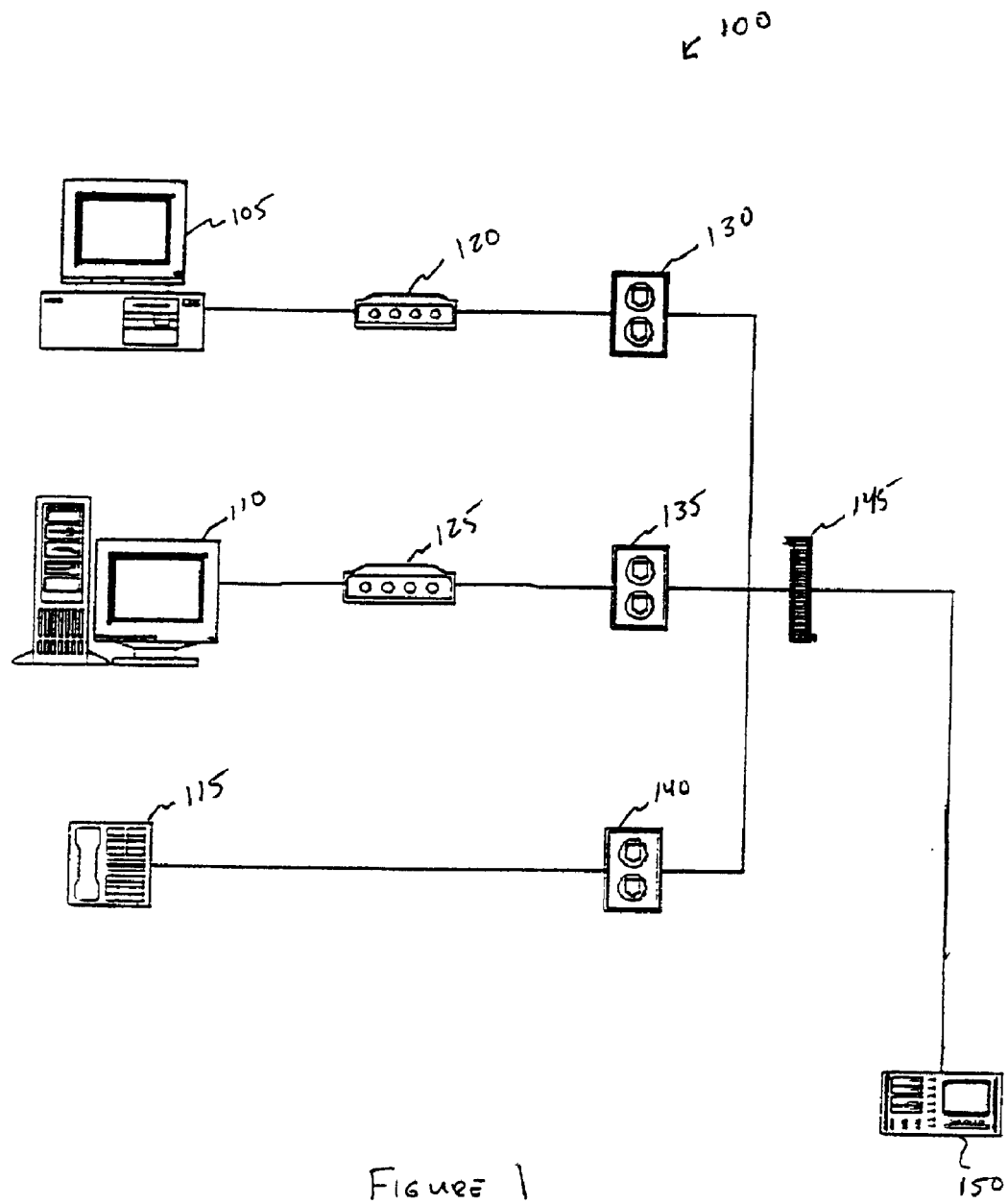
FIG. 1 illustrates a Digital Subscriber Line network having multiple remote terminals according to the present invention.

An exemplary Digital Subscriber Line (DSL) network 100 having multiple remote terminals is illustrated in FIG. 1. The exemplary DSL network 100 includes terminals 105, 110, a telephone 115, modems 120, 125, telephone line connection plates 130, 135, 140, a network interface device 145, and central office equipment 150. The modems 120, 125 may be RT ADSL modems and share the premise phoneline wiring with standard POTS equipment such as the telephone 115. Although two modems 120, 125 are shown, it can be appreciated that any number of modems may share the premise phoneline wiring. The terminal 105 is electrically connected to the phoneline through the modem 120 and the telephone line connection plate 130. The terminal 110 is electrically connected to the phoneline through the modem 125 and the telephone line connection plate 135. The telephone 115 is electrically connected to the phoneline through the telephone line connection plate 140. The telephone line connection plates 130, 135, and 140 provide for a simple method of connecting the modems to the premise phoneline wiring. The connections used in the telephone line connection plates 130, 135, and 140 are well know in the art and include, among other devices, RJ-11 jacks. The premise phoneline wiring is terminated at the network interface device 145 which is connected to the local subscriber loop. The network interface device 145 allows connection of the premise phoneline wiring to the central office equipment 150 via the subscriber loop. The subscriber loop is terminated at the central office by the Public Switch Telephone Network and the CO DSL modem.

ADSL modems use Discrete MultiTone (DMT) modulation for communication. In the time domain, DMT is the equivalent of adding pure tones of differing phase and amplitude over a specific time duration referred to as a symbol. During normal data exchange, the phase and amplitude of each tone changes from one symbol to the next. These changes cause a discontinuity in time at the symbol boundary.

For multiple remote modems to communicate without interfering with the connection to the central office equipment 150, the symbols of each modem should be aligned. By aligning the symbols, the impulse response caused by the discontinuity between the symbols may occur at approximately the same time.

Figure 2:
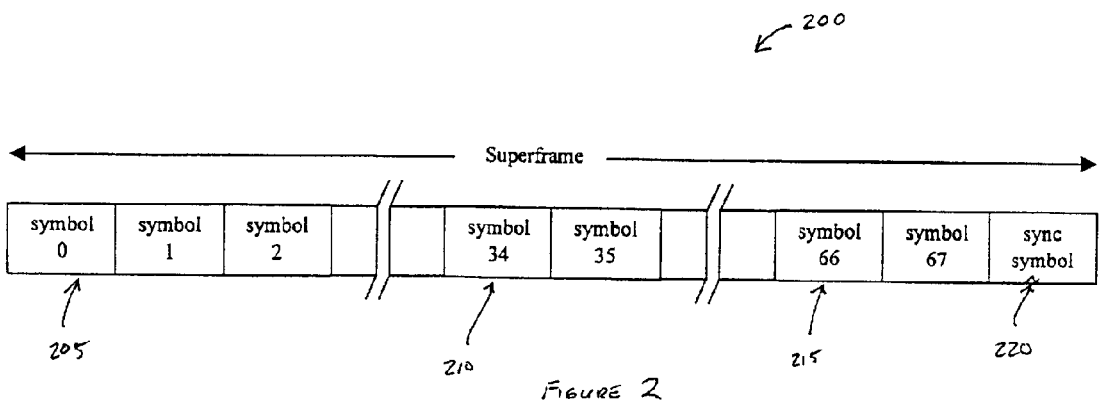
FIG. 2 is a representation of a superframe used to communicate information between DSL modems.

An ADSL modem may communicate using a superframe 200 as illustrated in FIG. 2. A typical superframe 200 has 68 data symbols 205–215 followed by a DMT synchronization symbol 220. The synchronization symbol 220 is used to establish boundaries between superframes 200 and the synchronization symbol 220 carries no user bit level data. Each synchronization symbol 220 in successive superframes 200 uses the same tone phase and amplitude each time they are transmitted. The data symbols 205–215 include data that is scrambled prior to being quadrature amplitude modulation (QAM) encoded. Because the data is scrambled, each data symbol 205–215 sends a randomized phase and amplitude for each tone in their set. By locating the superframe 200 boundaries, the symbols of each modem not involved in the communications with the central office may be aligned, thus allowing for communication between modems.

Figure 3A:
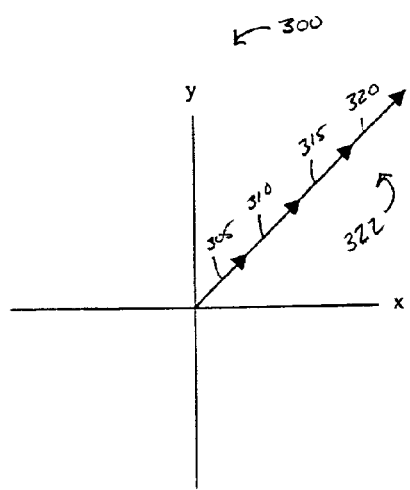
FIG. 3A is a graphical representation of the addition of the synchronization symbol tone vectors.

Each of the individual tones in the data symbols 205–215 and the synchronization symbol 220 may be represented as a vector. The tones in the synchronization symbol 220 are the same in each superframe 200, and may be combined using vector addition. FIG. 3A is a graphical representation 300 of the addition of the synchronization symbol 220 tone vectors. In a first superframe 200, the tones of the synchronization symbol 200 may be represented by a vector 305. The tones of the synchronization symbol 200 in subsequent superframes may be represented by vector 310, 315 and 320. Because the tones in the synchronization symbol 220 are the same in each superframe 200, the vectors 305–320 are also the same and add upon one another. Thus, after the tones of the synchronization symbol 200 in a plurality of superframes are added, a single summed synchronization tone vector 322 is created.

Figure 3B:
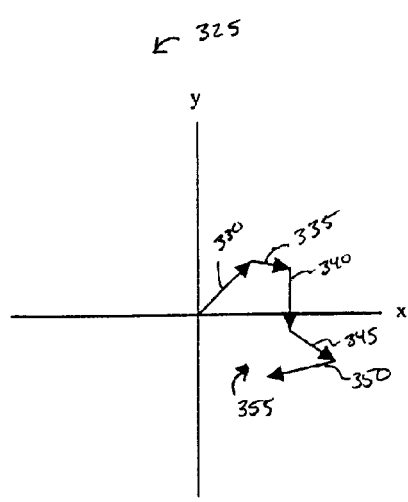
FIG. 3B is a graphical representation of the addition of a data symbol tone vectors.

FIG. 3B is a graphical representation of the addition of a data symbol 305 tone vectors across multiple superframes 200. As stated above, the data symbol 205 includes data that is scrambled prior to being QAM encoded. Because the data is scrambled, the data symbol 205 in a first superframe 200 may send a tone having a first phase and amplitude vector 330. In another superframes 200, the data symbol 205 may send a tone having a second phase and amplitude vector 335. Because the data is scrambled, it is likely that the second vector 335 differs from the first 330. Subsequent superframes 200 may include the data symbol 200 sending a tone having vectors 340, 345, and 350. The tone vectors 330–350 across multiple superframe may be combined to produce a summed symbol vector 355. Because the vectors 330–350 differ, the summed symbol vector 355 is likely to be much smaller than the summed synchronization tone vector 322. Thus, if all the symbol tone vectors are combined over a plurality of superframes 200, the symbol having the largest summed vector is likely to be the synchronization symbol 220.

Figure 4:
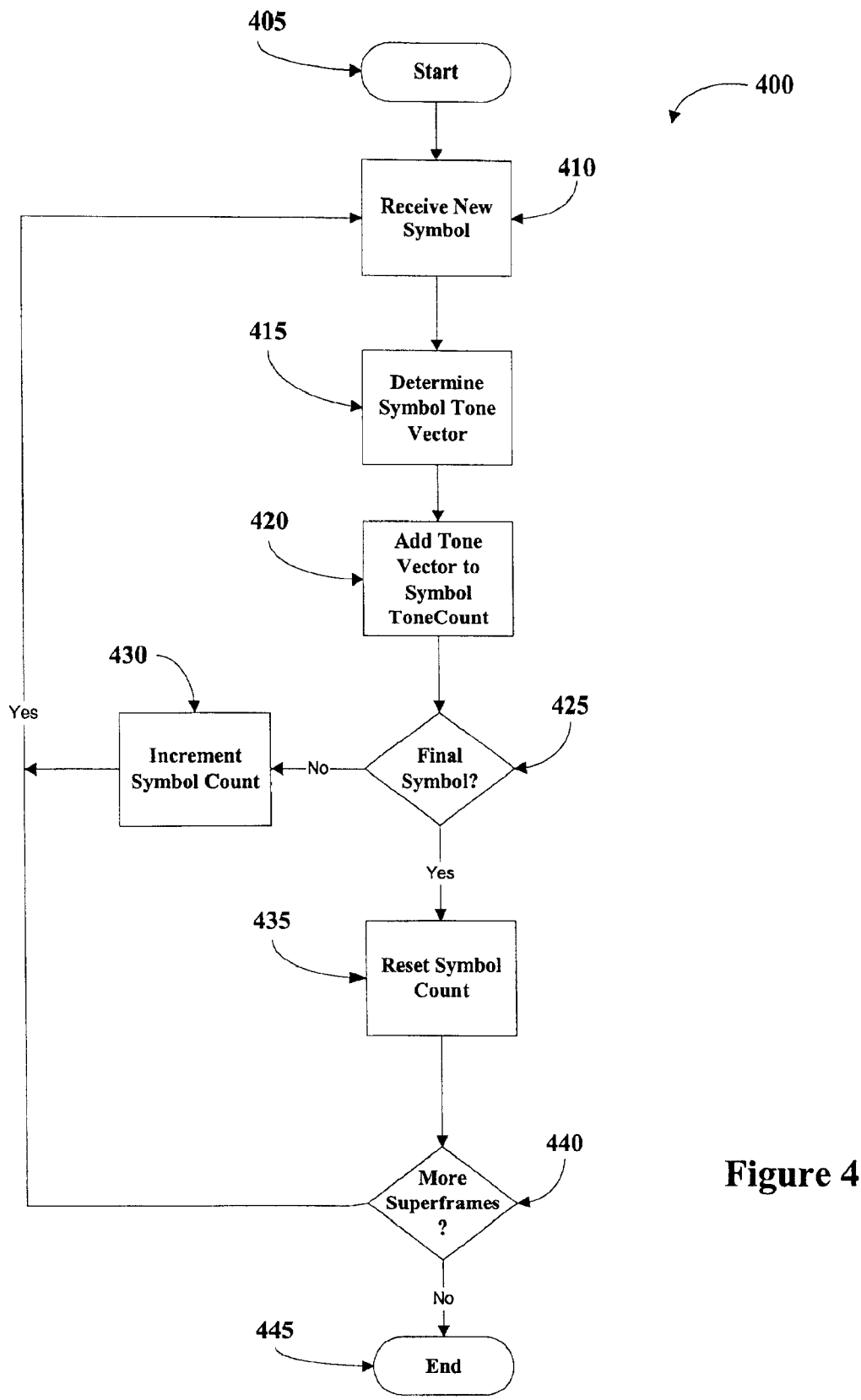
FIG. 4 is a flowchart illustrating the process used to integrate tone vectors over multiple superframes according to an embodiment of the present invention.

FIG. 4 is a flowchart illustrating the process 400 used to integrate tone vectors over multiple superframes 200. The process 400 begins at a START block 400. Proceeding to block 410, the process receives a new symbol as part of a first superframe 200. Each symbol has a symbol count to uniquely identify which symbol of the current superframe 200 is being sampled.

Proceeding to block 415, the tone vectors of the current symbol are determined. The process 400 then proceeds to block 420 where the tone vectors are added to an integrated total for the current symbol. The integrated total represents the summation of each of the tone vectors for the current symbol location in each of the preceding superframes. If the current superframe 200 is the first to be sampled, the integrated total would become the value of the current tone vectors. Thus, after multiple superframes 200 are sampled, the integrated total is representative of the summed vector 355.

Proceeding to block 425, the process check if the current symbol is the final symbol in the superframe 200. If there are more symbols in the superframe 200, the process 400 proceeds along the NO branch to block 430. In block 430, the symbol count is incremented to indicate the next symbol is to be processed. The process 400 then returns to block 410 to receive the next symbol for vector summation.

Returning to block 425, if there are no further symbols in the current superframe 200, the process 400 proceeds along the YES branch to block 435. In block 435, the symbol count is reset in the event more superframes 200 need to be counted.

Proceeding to block 440, the process 400 determines if more superframes 200 are to be summed. The number of superframes to sum prior to completing the process 400 may be predetermined, adjusted based on historical data, or set in any other matter. If more superframes 200 are to be added, the process 400 proceeds along the YES branch back to block 410 to receive the first symbol of the next superframe 200. Returning to block 440, if no additional superframes 200 are to be summed, the process 400 proceeds along the NO branch to terminate in an END block 445.

Figure 5:
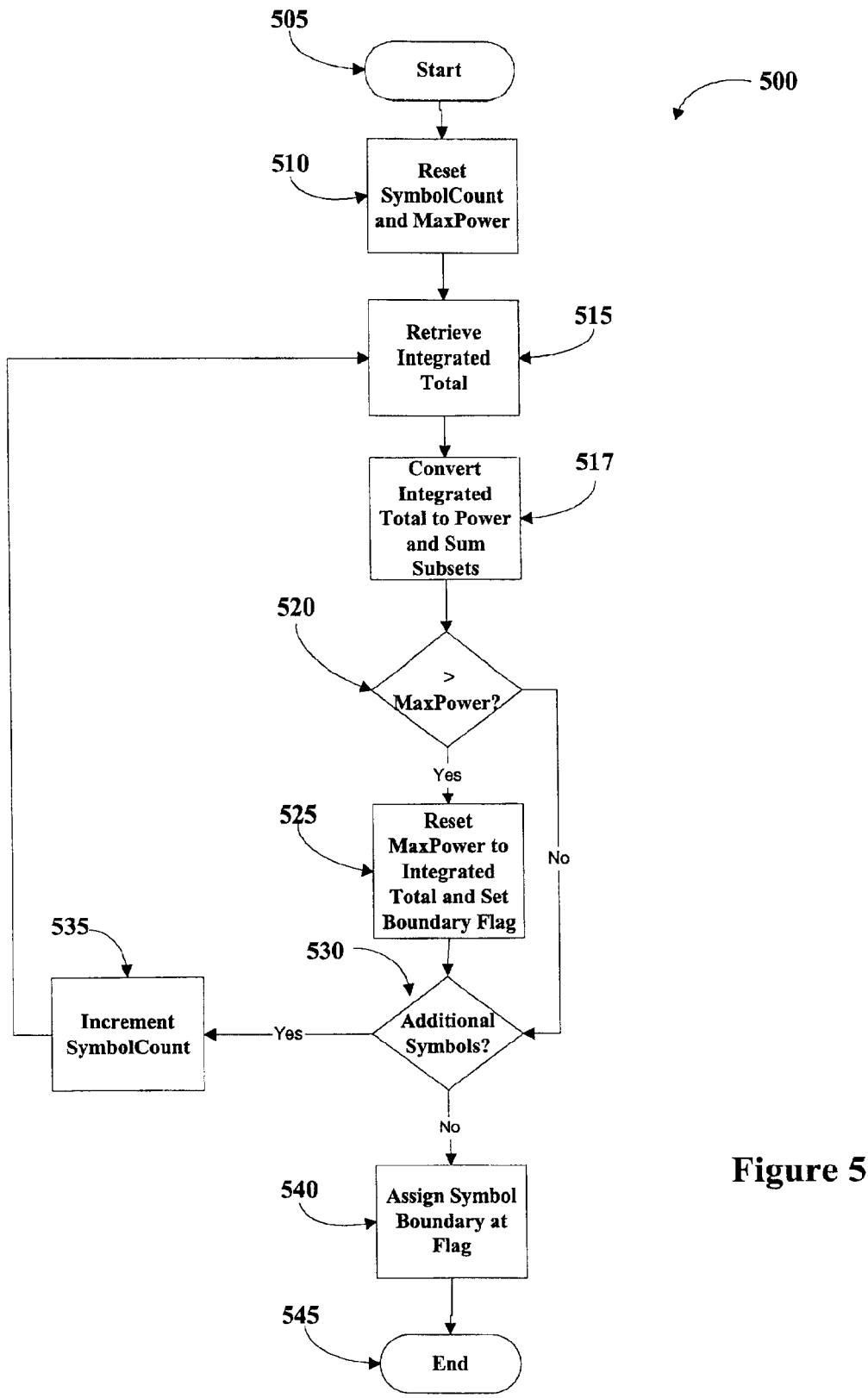
FIG. 5 is a flowchart illustrating the process used to locate the superframe boundary using the integrated tone vectors over multiple superframes according to an embodiment of the present invention.

FIG. 5 is a flowchart illustrating the process 500 used to locate the superframe boundary using the integrated tone vectors over multiple superframes 200 acquired according to the process 400 in FIG. 4. The process 500 begins at a START block 505. Proceeding to block 510, the process 500 resets the symbol count counter and a memory location labeled MaxPower. The memory location MaxPower stores the value of the largest summation vector sampled to date.

Proceeding to block 515, the process 500 retrieves the integrated total of the symbol based on the current value of the symbol count. The integrated total represents the value of the summed vectors for the current symbol count from all the sampled superframes 200.

Proceeding to block 517, the process 500 converts the integrated total to a power value. The sum of the power value is equivalent to the sum of the absolute values of the summed vectors for the current symbol, and may be defined as the power figure for the specific symbol position of the superframes.

Proceeding to block 520, the process 500 compares the symbol power figure to the value of MaxPower to determine if the symbol power figure is greater than the value of MaxPower. For the first symbol, the value of MaxPower is zero, and thus the first symbol should always be greater. For each subsequent symbol, having a symbol power figure greater than the value of MaxPower indicates that the value of the summed vectors from the current symbol count is larger than each of the previous summed vectors. If the value of the symbol power figure is not greater than MaxPower, the process 500 proceeds along the NO branch to block 530. If the value of the symbol power figure is greater than MaxPower, the process 500 proceeds along the YES branch to block 525. In block 525, the value of MaxPower is set to the value of the current symbol power figure. This creates a new standard to which each subsequent symbol power figure may be compared. The process 500 also sets a boundary flag to the current symbol count to indicate the symbol count that resulted in the changed value of MaxPower. Of course, the boundary flag indicated the symbol count of the largest summed vector.

Proceeding to block 530, the process 530 determines if additional symbols are available for comparison. Because the superframes 200 have a predetermined number of symbols, the process 500 may simply compare the symbol count to a predetermined number to determine if additional symbols are available. If additional symbols are available, the process 500 proceeds along the YES branch to block 535. In block 535 the process increments the symbol count and then returns to block 515 to retrieve the integrated total for the new symbol position. The process 500 remains in this loop until the power figures for each symbol position is compared.

Returning to block 530, if no additional symbols are present, the process 500 proceeds along the NO branch to block 540. In block 540, the process 500 indicates that the superframe boundary is located at the position of the boundary flag. The boundary flag was updated each time the integrated total exceeded the value of MaxPower. Because the summed synchronization vector 322 should have the largest power figure, the boundary flag indicates the symbol position of the synchronization symbol 220. This position may be communicated to each remote modem, thereby enabling communication among the modems without interfering with the connection to the central office. The process 500 then terminates in an END block 545.

Numerous variations and modifications of the invention will become readily apparent to those skilled in the art. Accordingly, the invention may be embodied in other specific forms without departing from its spirit or essential characteristics.

What is claimed is:

1. A method of identifying a superframe boundary comprising:
   summing data vectors for each symbol in a plurality of superframes;
   determining the summed data vector having the largest magnitude; and
   indicating the superframe boundary at the symbol position correlating to the largest summed data vector.

2. The method of claim 1, further comprising synchronizing a plurality of modems based on the superframe boundary.

3. The method of claim 1, further comprising representing data tones for each symbol as the data vectors.

4. The method of claim 3, further comprising combining the data tones of each symbol across the plurality of superframes.

5. The method of claim 1, further comprising converting the summed data to power.

6. The method of claim 5, further comprising comparing a current summed vector with previous summed vectors.

7. The method of claim 6, further comprising setting a boundary flag when the current summed vector is greater than all the previous summed vectors.

8. The method of claim 6, further comprising identifying a synchronization symbol based on the position of the boundary flag.

9. A method of aligning modems comprising:
   determining a summed vector having the largest value;
   identifying the position of a synchronization symbol in a superframe from the summed vector; and
   aligning the symbols of each modem based on the position of the synchronization symbol.

10. The method of claim 9, further comprising communicating between each modem using discrete multitone (DMT) symbols.

11. The method of claim 10, further comprising converting the DMT symbols into data vectors.

12. The method of claim 9, further comprising combining the data vectors over a plurality of superframes to create the summed vector.

13. A communication system comprising:
   a plurality of modems which communicate using a plurality of superframes, each of the plurality of superframes having a plurality of symbols, and
   a synchronizer which identifies the position of the superframe boundary, wherein the plurality of modems align based on the superframe boundary,
   wherein the synchronizer compares a summed data vector of each symbol time period of the plurality of superframes to determine the position of a synchronization symbol of the superframes, and
   wherein the symbol position having the summed data vector with the largest value is the synchronization symbol position.

14. The communication system of claim 13, wherein the plurality of modems are ADSL modems.

15. The communication system of claim 13, wherein the plurality of modems communicate using discrete multitone symbols.

16. The communication system of claim 13, wherein one of the plurality of modems communicates with a central office.

* * * * *